United States Patent
Reddy et al.

(10) Patent No.: US 9,729,565 B2
(45) Date of Patent: Aug. 8, 2017

(54) PROVISIONAL BOT ACTIVITY RECOGNITION

(71) Applicant: Cisco Technology, Inc., San Jose, CA (US)

(72) Inventors: Tirumaleswar Reddy, Bangalore (IN); Prashanth Patil, Bangalore (IN); Daniel Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 53 days.

(21) Appl. No.: 14/488,973

(22) Filed: Sep. 17, 2014

(65) Prior Publication Data

US 2016/0080395 A1 Mar. 17, 2016

(51) Int. Cl.
*H04L 29/06* (2006.01)
*H04L 29/08* (2006.01)
*H04L 29/12* (2006.01)

(52) U.S. Cl.
CPC ...... *H04L 63/1425* (2013.01); *H04L 63/0236* (2013.01); *H04L 63/145* (2013.01); *H04L 67/02* (2013.01); *H04L 67/10* (2013.01); *H04L 69/16* (2013.01); *H04L 69/22* (2013.01); *H04L 61/1511* (2013.01); *H04L 61/2514* (2013.01); *H04L 63/1408* (2013.01); *H04L 2463/144* (2013.01)

(58) Field of Classification Search
CPC . H04L 63/1425; H04L 63/1408; H04L 67/10; H04L 63/145; H04L 67/02; H04L 61/2007
See application file for complete search history.

(56) References Cited

U.S. PATENT DOCUMENTS

| | | |
|---|---|---|
| 8,006,305 B2 | 8/2011 | Aziz |
| 8,149,841 B2 | 4/2012 | Moore et al. |
| 8,171,553 B2 | 5/2012 | Aziz et al. |
| 8,205,258 B1 | 6/2012 | Chang et al. |
| 8,260,914 B1 | 9/2012 | Ranjan |
| 8,806,572 B2 | 8/2014 | McGrew et al. |
| 8,914,406 B1 * | 12/2014 | Haugsnes ............. G06F 21/552 382/305 |
| 2007/0022468 A1 * | 1/2007 | Iijima ................. H04L 63/0209 726/3 |

(Continued)

FOREIGN PATENT DOCUMENTS

WO    WO2009155453    12/2009

OTHER PUBLICATIONS

Yuanyuan Zeng, "On detection of current and next-generation botnets", dissertation, University of Michigan, ProQuest Dissertations & Theses Global (2012).*

Neil Fowler Wright, "DNS in computer forensics", Journal of Digital Forensics, Security and Law JDFSL, 7(2), pp. 11-41 (2012).*

(Continued)

*Primary Examiner* — Theodore C Parsons

(57) ABSTRACT

In one implementation, a network device is configured to monitor communications associated with an endpoint and identify domain name service messages in the communications. Subsequently, the network device receives a hypertext transfer protocol (HTTP) request and determines whether a destination internet protocol (IP) address of the HTTP request is present in or absent from the domain name service messages. When the IP address is absent from the domain name service messages, the HTTP request is modified to trigger increased security.

15 Claims, 6 Drawing Sheets

(56) References Cited

U.S. PATENT DOCUMENTS

| | | | |
|---|---|---|---|
| 2007/0220607 A1* | 9/2007 | Sprosts | G06Q 10/107 726/24 |
| 2008/0028463 A1 | 1/2008 | Dagon et al. | |
| 2008/0141346 A1* | 6/2008 | Kay | H04L 12/58 726/4 |
| 2010/0002704 A1 | 1/2010 | Moore et al. | |
| 2010/0235915 A1 | 9/2010 | Memon et al. | |
| 2011/0185425 A1 | 7/2011 | Lee et al. | |
| 2012/0042381 A1 | 2/2012 | Antonakakis et al. | |
| 2012/0054869 A1 | 3/2012 | Yen et al. | |
| 2012/0096546 A1* | 4/2012 | Dilley | H04L 67/2804 726/22 |
| 2014/0101764 A1* | 4/2014 | Montoro | H04L 63/145 726/23 |

OTHER PUBLICATIONS

Pieter Burghouwt, Marcel Spruit, Henk Sips, Towards Detection of Botnet Communication through Social Media by Monitoring User Activity, Information Systems Security, vol. 7093, pp. 131-143, Lecture Notes in Computer Science (Dec. 19, 2011).*
OpenDNS Security Research: "Blackhole" Exploit Kit DGA Analysis, Jul. 10, 2012, OpenDNS.
The Role of DNS in Botnet Command and Control, 2012, OpenDNS Security Whitepaper.
Weymes, DNS Anomaly Detection: Defend Against Sophisticated Malware, Part 1, May 28, 2013, net-security.org.
Weymes, DNS Anomaly Detection: Defend Against Sophisticated Malware, Part 2, May 28, 2013, net-security.org.
Wing, Coping with IP Address Literals in HTTP URIs with IPv6/IPv4 Translators, Internet Draft, 2009, IETF Trust.

* cited by examiner

PROVISIONAL BOT ACTIVITY RECOGNITION

TECHNICAL FIELD

This disclosure relates in general to the field of detection of automated bot software.

BACKGROUND

A bot is a software application that runs automated tasks over the Internet. The Internet relies on bots. For search engines to function, a bot runs an algorithm for crawling or web spidering in which the bot fetches and analyzes files and content from web servers. The information from the bot is used to index various websites. Search engines use the indexes to provide easily searchable databases. Bots may also be used in chat rooms or instant messaging interfaces to provide automated information to users.

However, bots have gained greater notoriety when used for malicious purposes. Bots are the root cause of many security problems on the Internet. Bots may be programmed to send spam, steal information from infected machines, and perform distributed denial-of-service attacks.

Many approaches to bot detection have been proposed, but the approaches either rely on end-host installations, or, if they operate on network traffic, require deep packet inspection (DPI) for signature matching.

BRIEF DESCRIPTION OF THE DRAWINGS

Exemplary embodiments of the present embodiments are described herein with reference to the following drawings.

FIG. 3 illustrates an example of a timing chart for the network of FIG. 2.

DESCRIPTION OF EXAMPLE EMBODIMENTS

Overview

A method includes monitoring communications associated with an endpoint and identifying domain name service messages in the communications. After receiving a hypertext transfer protocol (HTTP) request including an internet protocol (IP) address, the method determines whether the IP address is present in or absent from the domain name service messages and modifies the HTTP request in response to the IP address being absent from the domain name service messages.

Example Embodiments

The malicious bot industry is agile. As new techniques are developed to thwart malicious efforts, the bot programmers adapt and find new ways to promulgate attacks. The bots may operate or collaborate in a botnet. The botnet may include a command and control server, which may be referred to as a bot commander or bot herder, and the bots themselves, which run on individual endpoint devices. The command and control server instructs the bots to do things like skim credit card info, release confidential data, perform denial of service attacks, or otherwise infect the network of the endpoint devices on which the bots are installed. The bots infect or are recruited onto the endpoint device through downloads, weakness is web browser security, or a Trojan horse program. One way to identify bot activity is to detect communication with the command and control server. For example, if the IP address of the command and control server is known, attempts to communicate using the IP address can be detected and blocked. Edge routers may detect domain name system (DNS) messages that include the IP address associated with the command and control server.

A new type of bots is becoming more sophisticated. These bots do not use DNS messages. Instead, to avoid being tracked when communicating with the bot command and control server, these bots reach out to IP addresses that are cleverly obtained as part of random text served from established information source (e.g. websites such as blogs). The blog could be maintained by popular content providers, social networking sites, or other entities. The command control server may advertise its IP address by posting a comment on a specific blog. Many blogs allow anonymous users to post comments. The comment may include text that is randomly generated along with the IP address embedded in the blog. The IP address information could also be encrypted. To communicate with the command and control server, bots request content from the blog, identify the IP address in the text so that it can reach the command and control server. The blog is frequently updated with new IP addresses whenever the command and control server is detected and blocked. The following embodiments include examples that aid in the detection of these types of bots that circumvent normal DNS messaging and distribute IP addresses for the command and control server on publicly available sections of established websites.

Figure 1:
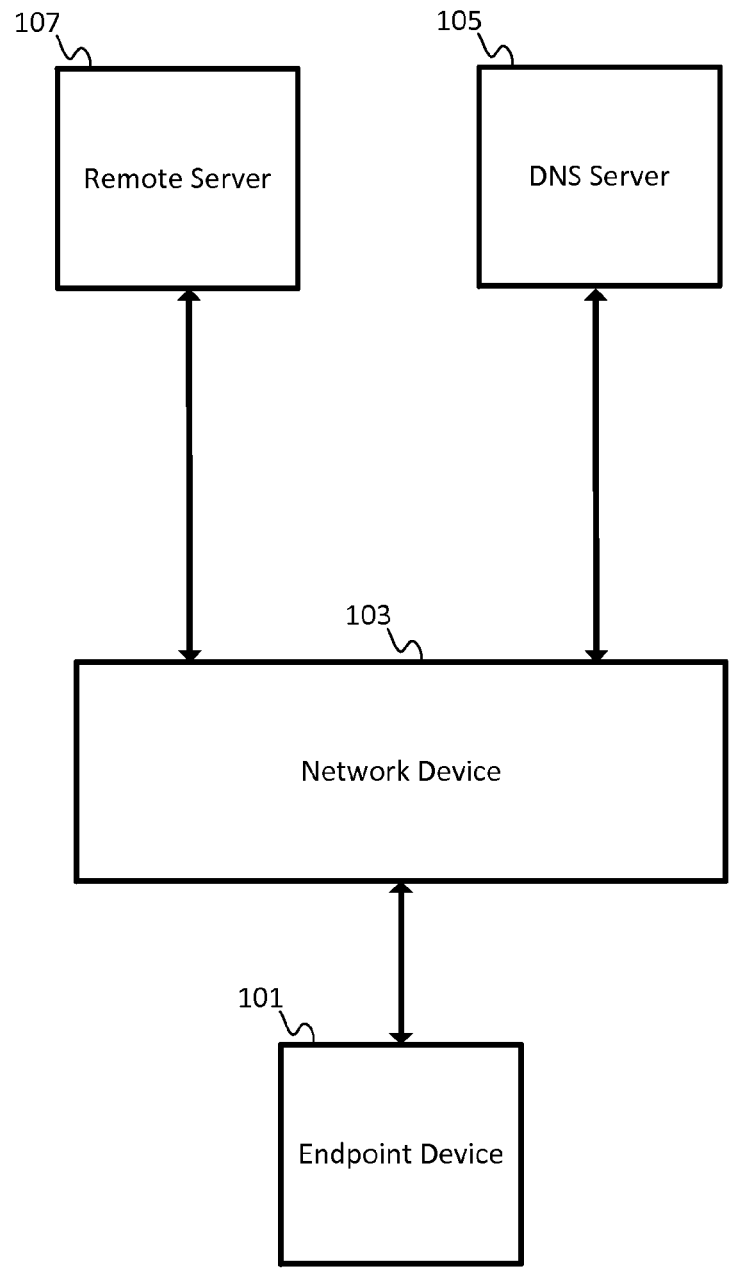

FIG. 1 illustrates an example network for bot activity recognition. The network includes an endpoint device 101 and a network device 103, which is in communication with a DNS server 105 and a remote server 107, which may be any type of content provider. Multiple endpoint devices may be included, and the endpoint devices may be personal computers, mobile devices, set top boxes, tablet computers, or any computing device configured for network communication. Additional, different, or fewer components may be included.

The network device 103 is configured to aid in the detection of malicious bots on the endpoint device 101. The network device 103 monitors communications associated with the endpoint device 101. Some of those communications are associated with DNS messages. DNS messages include requests to translate domain names to numerical Internet protocol (IP) addresses. The DNS request from the endpoint device 101 to the DNS server 105 includes the domain name, and the DNS response from the DNS server 105 to the endpoint device 101 includes the IP address. The network device 103 is configured to identify the DNS messages among other communications, and extract domain names or IP addresses from the DNS messages. DNS messages may be identified based on the destination IP address corresponding to a DNS server or based on a message type identifier field in the DNS messages. The network device 103 may store the domain names or IP addresses in a table of recently queried addresses. One example DNS request, DNS response, and entry in the table may correspond to the remote server 107.

The network device 103 continues to monitor communications between the endpoint device 101 and the Internet, including at least one remote server 107. The remote server 107 is a host for websites or other content. The communications may include a hypertext transfer protocol (HTTP) request including an IP address of the remote server 107. In addition, the communications may include any type of transmission control protocol (TCP) session sessions from the host such as file transfer protocol (FTP), simple mail transfer protocol (SMTP), HTTP secure or any other L7 protocol over TCP. The network device 103 accesses the table of recently queried addresses to determine whether the IP address of the remote server 107 is present in or absent from previous DNS messages.

When the IP address of the remote server 107 is present in the table, then the endpoint device 101 has made a DNS query as expected. However, when the IP address of the remote server 107 is absent (not present) in the table, then the endpoint device 101 has not made a DNS query as expected, which may be indicative of a suspicious message or that the remote server 107 is suspicious. In one example, the network device 103 may block communication with the suspicious server. In another example, the network device 103 may increase the security level for communications originating with the remote server 107. The network device 103 may filter traffic based on the security level, or the network device 103 may modify the HTTP request in response to the IP address being absent from the domain name service messages and forward the HTTP request toward its destination. For example, the network device 103 may add metadata to the HTTP request that may be read by a security device or server upstream from the network device 103.

Figure 2:
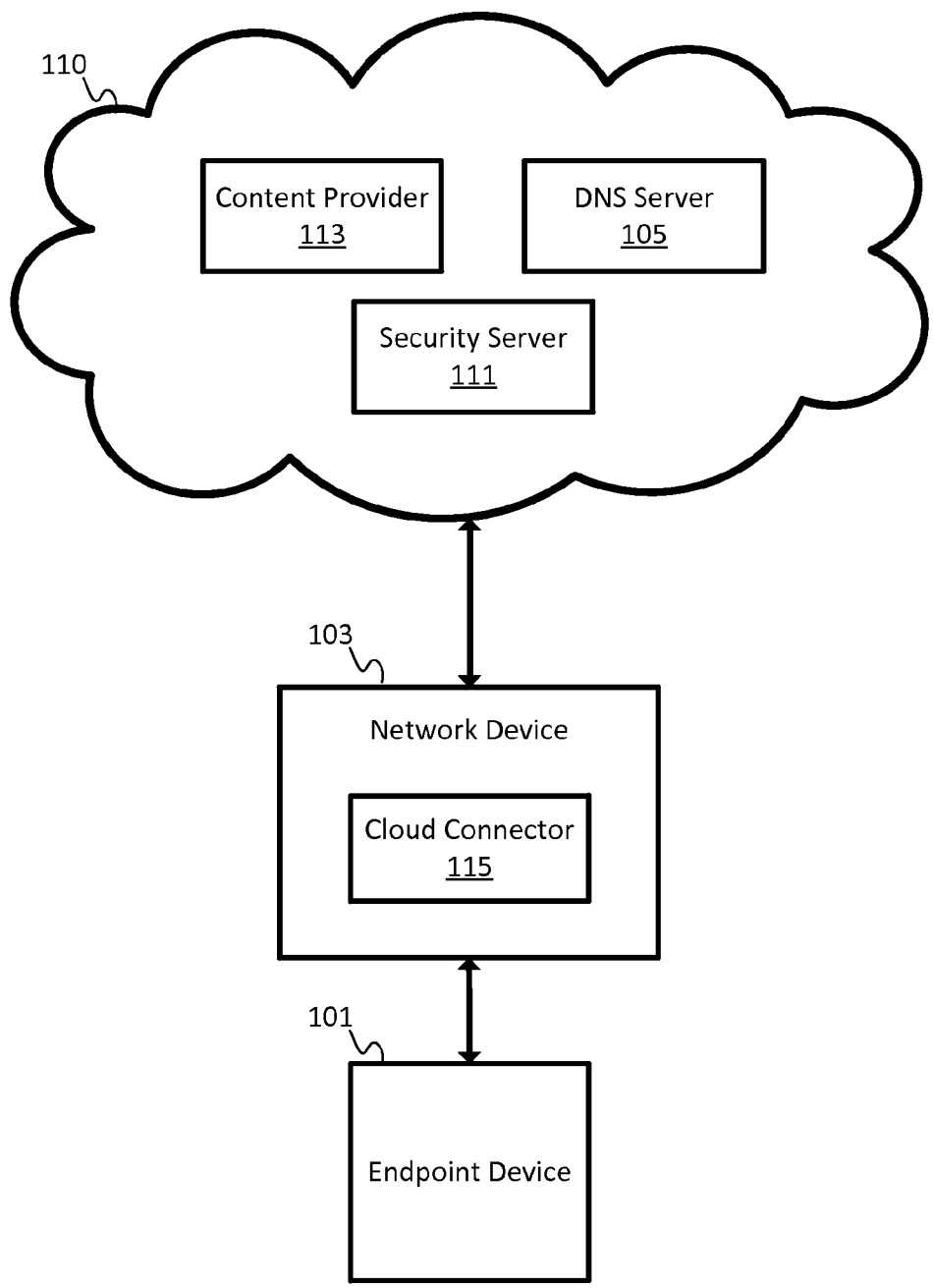
FIG. 2 illustrates another example network for bot activity recognition.

FIG. 2 illustrates another example network for bot activity recognition. The network includes a local network including endpoint device 101 and a network device 103, and a remote network 110. The network device 103 may include a cloud connector 109. The remote network 110 may include a DNS server 105, a security server 111, and a content provider 113. Additional, different, or fewer components may be included.

As described above, the network device 103 is configured to monitor DNS messages and track IP addresses that have been requested through the DNS system. Searched IP addresses may be stored in memory for a predetermined amount of time. The predetermined amount of time may any amount of time such as one day, one month, or one year. The predetermined amount of time may be infinite (e.g., all IP addresses are stored).

The cloud connector 109 is a module or software running on the network device 103, which may be an edge router. The cloud connector 109 is configured to insert metadata into a data packet that lists a destination IP address that is not included in the table of IP address that have been requested through the DNS system. The metadata may indicate a modification for the security enforcement that is later applied to the data packet. The metadata may be a single bit field. For example, 0 indicates normal security, and 1 indicates normal security. Similarly, 0 indicates that the destination IP address of the data packet has been included in a DNS messages, and 1 indicates that the destination IP address has not been included in a DNS message.

The cloud connector 109 sends the data packet including the metadata to a policy enforcement device. The policy enforcement device may be a firewall local to the network device 103. The policy enforcement may be a security server 111 is configured to detect, filter, restrict, or permit data traffic flows from the remote network 110 to the endpoint device 101. The security server 111 is configured to enforce a policy by applying the policy to intercepted data packets. The security server 111 may block some data packets according to the policy and forward some data packets according to the policy.

In one example, the policy may be either a first security level (high scrutiny level) or a second security level (low scrutiny level). The security server 111 may select the second security level when the metadata indicates the IP address is present in the domain name service messages or table and select the first security level when the metadata indicates that the IP address was absent from the domain name service messages or table.

In one example, the policy may be a rating (e.g., number between 1 and 10) that describes the security level for the network. The rating may be compared to a variable score for individual endpoints. When the variable score exceeds the rating, the data packets are filtered, blocked, or forwarded for additional inspection (e.g., deep packet inspection).

The variable score may be a function of multiple factors. The factors may include the geographic location of the endpoint, the type of content, the volume of data from the endpoint, a particular range of IP addresses, or the type of media protocol. The geographic location of the endpoint, or the geographic location associated with the source IP address of the data packet. Some geographic areas may be associated with hacking or a lack of governmental oversight. For those geographic locations, the score is increased, which tends the likelihood that the security service 111 would filter or block the data packet.

Some types of content may be more likely to be malicious than others. For example, HTTP messages may be the most likely form of communication from the command and control server for the botnet providing instructions for a bot running on the endpoint. HTTP messages may receive higher scores than other types of content that may not likely be carrying bot commands. For example, media streams, and peer to peer communications (e.g., instant messaging, torrents, session initiation protocol (SIP), teleconferencing, and other examples) are unlikely to be hiding bot commands.

The volume of data being sent from a certain IP address or an endpoint may be indicative of malicious activity. When data volume exceeds a threshold, a higher score may be applied to the data. In addition, certain IP ranges may be suspicious. For example, IP addresses assigned by Internet service providers (i.e., home users, mobile users, or others) are unlikely to host web servers and should not normally be receiving high traffic volumes. Thus, higher scores may be assigned to data packets listing IP addresses assigned to users by Internet service providers.

When the score exceeds the threshold or rating of the security policy, the security server 111 is configured to apply a variety of techniques on the data to determine whether the data is malicious. The techniques include sandboxing, heuristics, and other techniques. In heuristics, the security server 111 executes commands included in the communications on a virtual machine to internally simulate what would happen if the software was run on the endpoint. The potentially malicious code is isolated from the outside world. Similarly, sandboxing involves separating a small set of resources (e.g., disk space, memory) of the security server 111 for testing the potentially malicious code before allowing it to reach an endpoint. The sandbox may not be given network access or privileges such as reading the host system or input devices. The security server 111 may apply different techniques to different score ranges.

Figure 3:
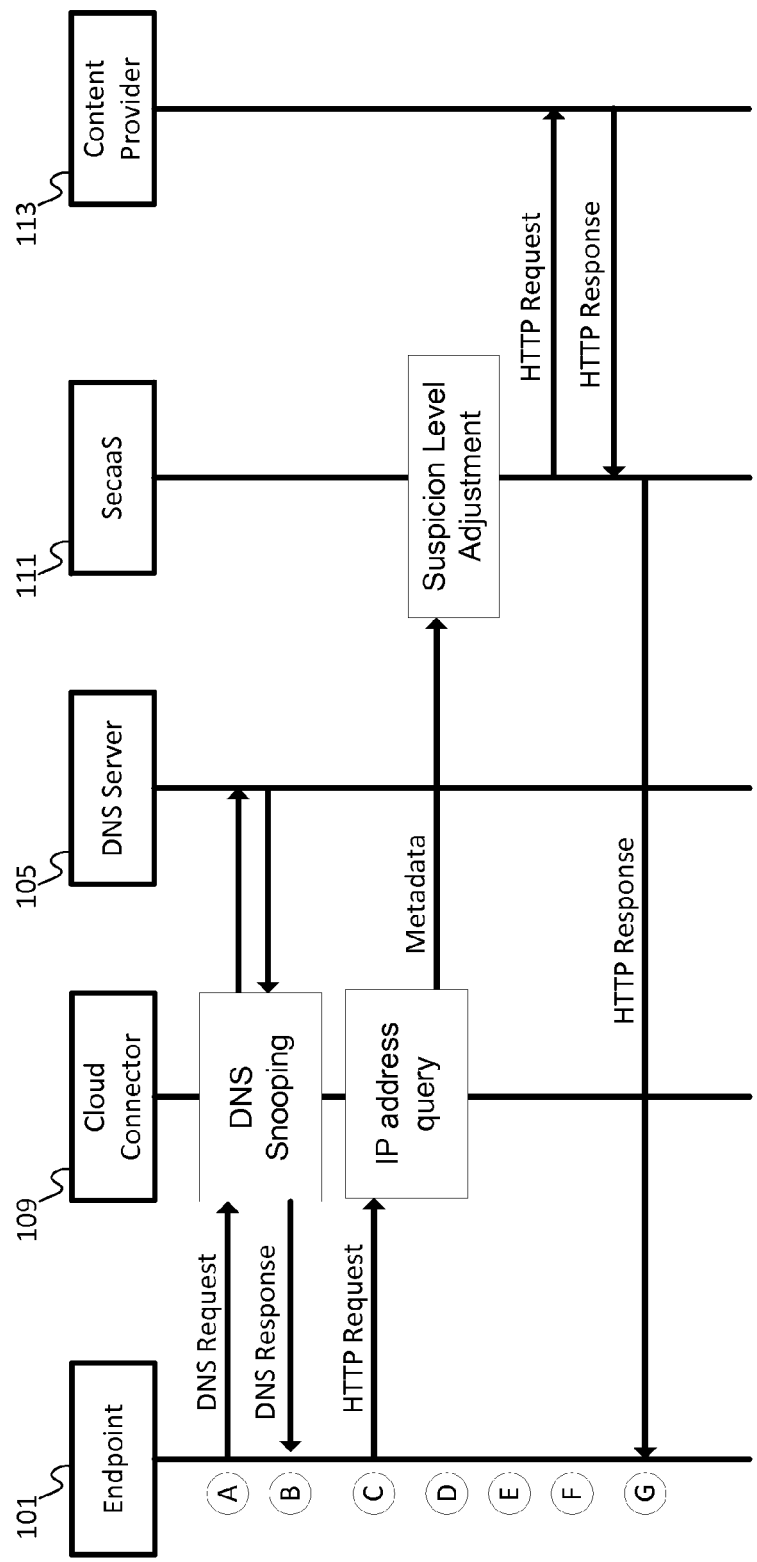
FIG. 3 illustrates an example network for bot activity recognition.

FIG. 3 illustrates an example of a timing chart for the network of FIG. 2. All of the stages may not be included in some examples. In stage A, the endpoint 101 sends DNS requests to the cloud connector 109, or the cloud connector 109 may be performing DNS snooping or monitoring all DNS traffic across the network.

In stage B, the endpoint 101 receives a DNS response from the cloud connector 109 or directly from the DNS server 105. The cloud connector 109 of the edge device may also be configured to send DNS requests to DNS servers provided by cloud-based SecaaS (e.g., Open DNS) instead of using the authoritative DNS servers offered by the internet service provider.

The cloud-based SecaaS may also directly block Bots using DNS. If a DNS request is identified to be a "bad" site on a blacklist of identified command and control servers, then the edge device sends an internet protocol flow information export (IPFIX) record containing details of the DNS request, identification of the user endpoint 101, and the IP address of the endpoint to the SecaaS or security server 111. The IPFIX records may be logged so that further investigation may take place.

In stage C, the endpoint 101 sends an HTTP request to the cloud connector 109. The HTTP request may be a HTTP GET command that lists an IP address and resource locator. In stage D, the cloud connector 109 examines the HTTP request. The cloud connector 109 may access a memory storing recent or all DNS requests. The cloud connector 109 inserts metadata into the HTTP request when the IP address was not included in any of the snooped DNS messages from stage A. The metadata may be included in an inline header (e.g., x-scansafe header) with encrypted data that indicates that the HTTP request not be matched with a corresponding DNS message. The inline header is not part of the control portion of the HTTP packet. The inline header may be added to the HTTP request before the content-type field. The inline header may be any location in the HTTP that is not modified or removed by a network address translation (NAT) device. The cloud connector sends the modified HTTP request to the security as a service (SecaaS) or security server 111.

Alternatively or in addition, the metadata may be signaled in another protocol. The cloud connector 101 may use a tunnel (e.g., Internet protocol security suite (IPSec)) to direct traffic, including a data packet with the metadata, to the security server 111. IPSec using the Internet Key Exchange (IKE) to set up the security association through negotiating algorithms, keys, and capabilities. IKE version 2 (IKEv2) may be used to negotiate and inform IPSec regarding the capability to exchange the metadata. Thus, after the peers (e.g., cloud connector 109 and SecaaS 111) have acknowledged the metadata capability, the metadata may be inserted into an IPSec packet sent from the cloud connector 109 to SecaaS 111.

In one example, the cloud connector 109 may also include a whitelist. The whitelist may include IP addresses or IP address ranges that are exempt from heightened scrutiny by the security server 111. The whitelist addresses may include IP addresses that are linked to from popular websites. The whitelist may include popular websites based on historical traffic. The whitelist may list addresses that have translation using 464XLAT, which provides limited connectivity for IPv4 over IPv6 only network. Thus, the cloud connector 109 may modify the HTTP request to include high security level in response to the IP address being absent from the domain name service messages and absent from the whitelist table and modify the HTTP request to include a second security level in response to the IP address being absent from the domain name service messages and present in the whitelist table.

In stage E, the security server 111 modifies a security policy in response to the modified HTTP request. The security server 111 may increase the scrutiny to the HTTP request and/or future communications traveling to or from the endpoint 101.

It is also recognized that legitimate websites may be visited without a DNS query. For example, an IP address may be directly entered into a browser or hyperlinks with a website or other application may include the IP address rather than the domain name. In another example, the endpoint device 101 may keep a DNS cache of recently resolved IP addresses. It is possible that the endpoint device 101 travels from a first network (e.g., home) to a second network (e.g., work). In this case, the user may send the DNS request, receive the DNS response, and store the IP address in the DNS cache at the first network. When the user visits the same domain at the second network, the endpoint device 101 may skip the DNS process and retrieve the IP address from the DNS cache. Thus, the second network has no record of the DNS messages corresponding to the IP address. However, even if all of these "false positives" receive heightened scrutiny from the security server 111, the system is preferable over one in which all traffic must be inspected or one in which these types of bot communications go undetected.

In stage F, the security server 111 forwards the HTTP request to the content provider 113, which returns a response. The security server 111 may examine the response for malicious content. In one example, the security server 111 may block all content coming from the content provider 113 when the IP address of the content provider 113 is not associated with a corresponding DNS message. In one example, the security server 111 may inspect traffic coming from the content provider 113 and block the content when the traffic includes malicious code. When no malicious code is included, the content is forwarded to the endpoint 101, as shown by stage G.

Figure 4:
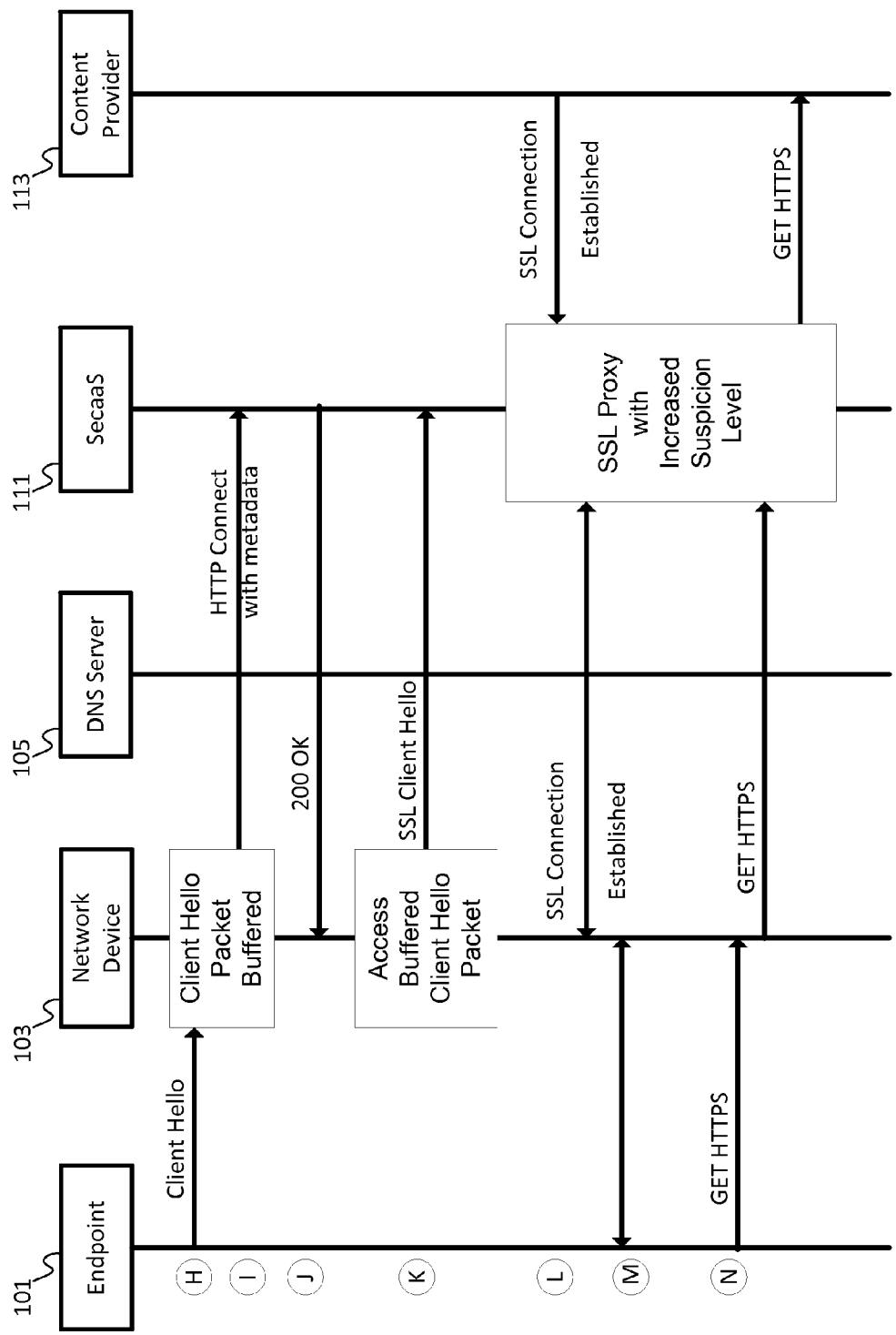
FIG. 4 illustrates another example of a timing chart for the network of FIG. 2.

FIG. 4 illustrates another example of a timing chart for the network of FIG. 2 using HTTPS. Additional, different, or fewer stages may be included in the timing chart. At stage H, the endpoint 101 generates and sends a Transport Layer Security (TLS) ClientHello packet to the network device 103. The TLS ClientHello packet is part of a Simple TLS handshake including a negotiation phase and an authentication phase. The TLS ClientHello packet is buffered by the network device 103. The network device 103 may access a memory storing recent or all DNS requests. The network device 103 inserts metadata into the HTTP request when the IP address was not included in any of the snooped DNS messages from stage A. The metadata may be included in an inline header (e.g., x-scansafe header) with encrypted data that indicates that the HTTP request not be matched with a corresponding DNS message. The metadata may explicitly state that bot activity is suspected or detected.

At stage I, network device 103 sends an HTTP Connect message with the metadata to the security service 111, which may respond with an acknowledgment message (e.g., 200 OK) at stage J. The network device 103 accesses the buffered Client Hello packet and forwards a Secure Sockets Layer (SSL) Client Hello packet to the security service 111, at stage K.

As shown in stages L and M, the security service 111 proceeds as a SSL Proxy with a suspicion level based on the metadata in the HTTP connect message in stage I. When the metadata indicates that the IP address of the content provider 113 could not be matched with a DNS query, the suspicion may be set to a high level. When the metadata indicates that the IP address of the content provider 113 can be matched with a DNS query, the suspicion may be set to a low level. The suspicion level is applied to one or more security policies for subsequent HTTPS flows, as shown by stage N.

In one example, the local network may include multiple edge routers or other network devices configured to detect flag communications for potential bot activity. When multiple devices are included in a single network, the table of DNS messages may be synced between them. That is, in stage B, the cloud connector 109 may send notifications to other cloud connectors or edge routers when DNS messages are snooped. The DNS message tables may be stored at a central location or at all of the cloud connectors or edge devices.

Figure 5:
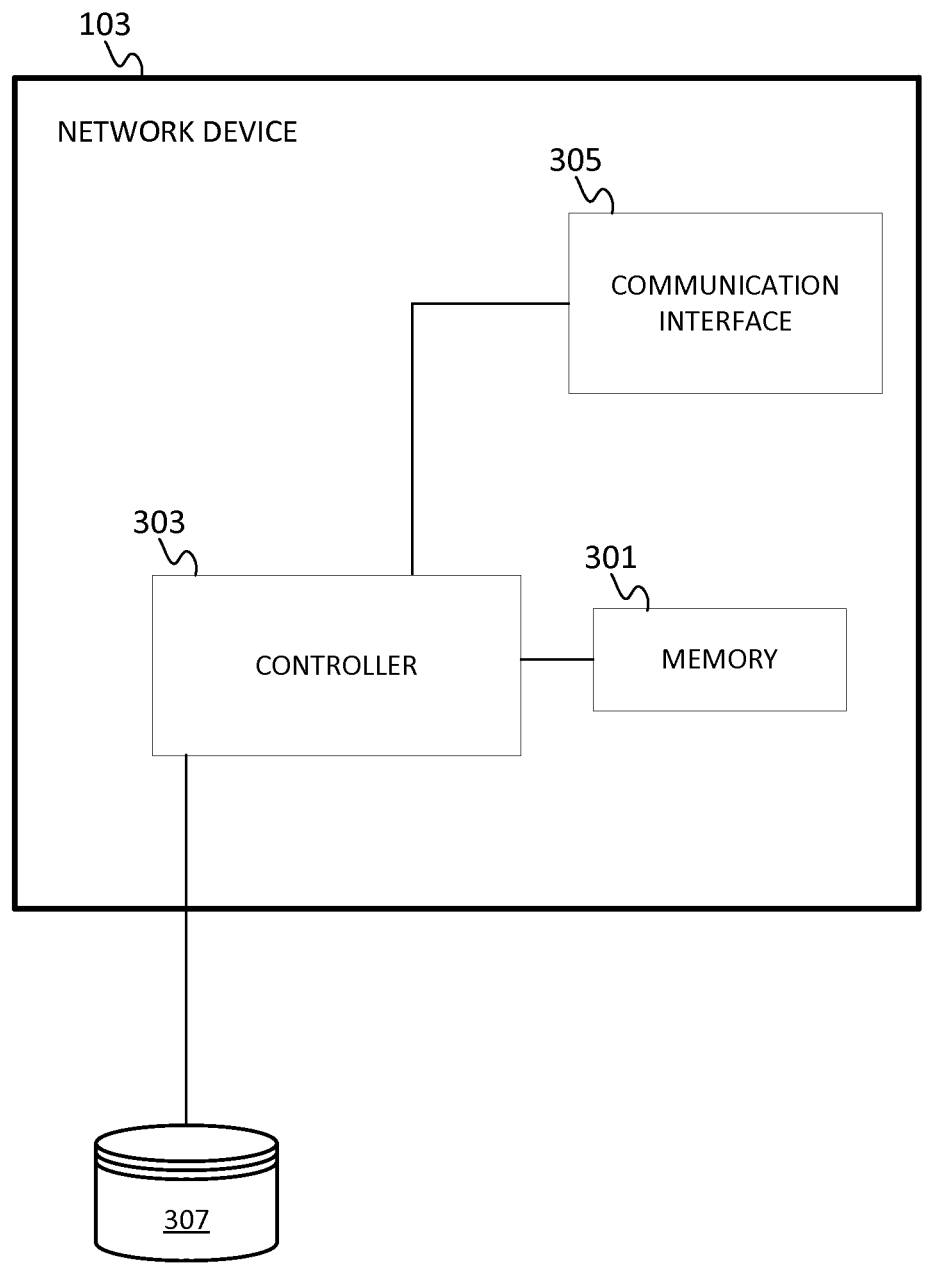
FIG. 5 illustrates an example network device for the networks of FIG. 1 or 2.
Figure 6:
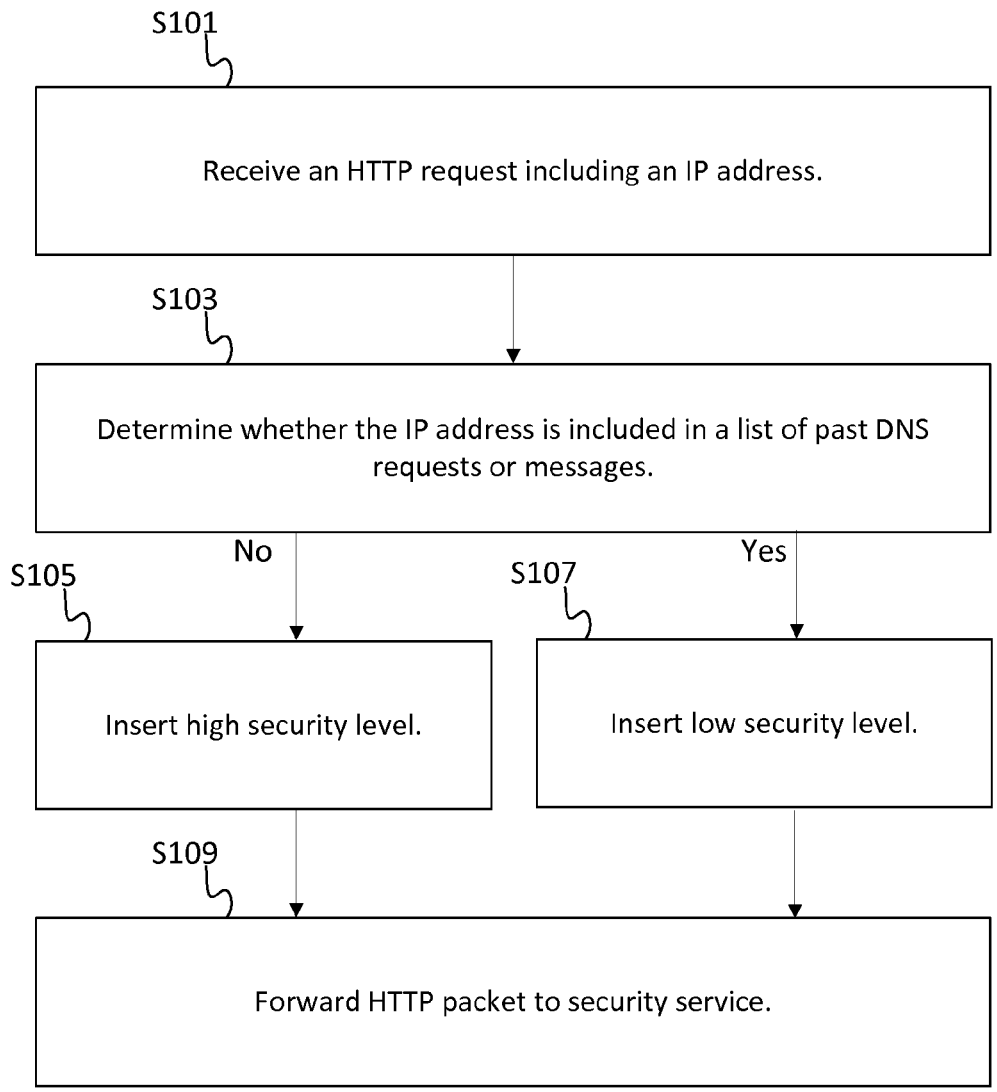
FIG. 6 illustrates an example flowchart for the network device of FIG. 6.

FIG. 5 illustrates an example network device 103 (e.g., edge router) for the networks of FIG. 1 of FIG. 2. The network device 103 includes at least a memory 301, a controller 303, and a communication interface 305. In one example, a database 307 stores the table of past DNS messages. Additional, different, or fewer components may be provided. Different network devices may have the same or different arrangement of components. FIG. 6 illustrates an example flowchart for the network device 103. Additional, different, or fewer acts may be provided. The acts are performed in the order shown or other orders. The acts may also be repeated.

At act S101, the communication interface 305 receives, from an endpoint, an HTTP request including an IP address. At act S103, the controller 303 determines whether the IP address is present in or absent from a list or table of domain name service messages associated with the endpoint.

At act S105, the controller 303 modifies the HTTP request in response to the IP address being absent from the domain name service messages. The HTTP request may be modified to indicate a high security level for a security review of the HTTP packet or additional data packets associated with the same source or the same destination.

At act S107, the controller 303 modifies the HTTP request in response to the IP address being present in the domain name service messages. The HTTP request may be modified to include a low security level for a security review of the HTTP packet. Alternatively, in act S107 the controller 303 may make no changes to the HTTP request when the IP address is present in the domain name service messages. That is, when the IP address is present and there has been a corresponding DNS query, the packet is handled normally.

At act S109, the communication interface 305 forwards the modified HTTP packet to a security service. The security service extracts the metadata including the security level and processes the HTTP packet based on the security level. In one example, the security service does nothing when the security level is low and inspects the HTTP packet further when the security level is high.

In another example, the security service has an established security policy including multiple security tiers. For example, the security tiers may include a low tier security, a medium tier security, and a high tier security. Traffic for the different tiers is subjected to different levels of inspection. Various users or endpoints are assigned a security tier based on multiple factors including history, administrative configuration, geographic location, and traffic volume usage. When the security service receives a high security level in an HTTP packet for a user associated with a low tier security, the security service may increase to medium tier security or high tier security. In addition or in the alternative, when the security service receives a low security level in an HTTP packet for a user associated with a medium tier security, the security service may increase to high tier security.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The memory 301 is a non-transitory computer-readable medium, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    monitoring, at an edge router device, communications associated with an endpoint device;
    identifying domain name service messages in the communications of the endpoint device;
    receiving, at the edge router device, a hypertext transfer protocol (HTTP) request including an internet protocol (IP) address from the endpoint device;
    determining whether the IP address is present in or absent from the domain name service messages;
    inserting an inline header in the HTTP request in response to the IP address being absent from the domain name service messages,
    wherein the inline header is outside of the control portion of the HTTP request modifiable by a network address translation device;
    adding, at the edge router device, metadata to the HTTP request indicative of a first security level when the IP address is absent from the domain name service messages and a second security level when the IP address is present in the domain name service messages; and
    forwarding the modified HTTP request to a security as a service server that is cloud based, wherein, responsive to the metadata indicating the first security level, the security as a service server performs a first inspection operation on traffic associated with the HTTP request and, responsive to the metadata indicating the second security level, the security as a service server performs a second inspection operation on traffic associated with the HTTP request, wherein the first inspection operation is different from the second inspection operation.

2. The method of claim 1, wherein the first security level includes a higher scrutiny than the second security level.

3. The method of claim 1, further comprising:
    calculating a scrutiny score in response to the IP address being absent from the domain name service messages and at least one additional factor.

4. The method of claim 3, wherein the at least one additional factor includes geographic location, content type, or destination of the communications.

5. The method of claim 1, further comprising:
    querying a whitelist table based on the IP address, wherein modifying the HTTP request comprises:
        modifying the HTTP request to include data indicative of a first security level in response to the IP address being absent from the domain name service messages and absent from the whitelist table.

6. The method of claim 5, further comprising:
    modifying the HTTP request to include a second security level in response to the IP address being absent from the domain name service messages and present in the whitelist table.

7. The method of claim 1, wherein the IP address is associated with a command server for a botnet.

8. An apparatus comprising:
    a communication interface configured to receive, from an endpoint device, a hypertext transfer protocol (HTTP) request including an internet protocol (IP) address; and
    a controller configured to monitor traffic including the HTTP request and determine whether the IP address is present in or absent from a table of domain name service messages associated with the endpoint device and insert an inline header in the HTTP request based on whether the IP address is present or absent from the table of domain name service messages,
    wherein the inline header includes data indicative of a high security level in response to the IP address being absent from the domain name service messages and the inline header includes data indicative of a low security level in response to the IP address being included in the domain name service messages,
    wherein the communication interface is configured to forward the traffic to a security as a service server that is cloud based and in a remote network different than a network of the endpoint device, wherein, responsive to the metadata indicating the high security level, the security as a service server performs a first inspection operation on traffic associated with the HTTP request and, responsive to the metadata indicating the low security level, the security as a service server performs a second inspection operation on traffic associated with the HTTP request.

9. The apparatus of claim 8, wherein the controller is configured to calculate a score in response to the IP address being absent from the domain name service messages and at least one additional factor.

10. The apparatus of claim 9, wherein the at least one additional factor includes geographic location, content type, or destination of the communications.

11. The apparatus of claim 8, wherein the controller is configured to query a whitelist table based on the IP address.

12. The apparatus of claim 8, wherein the inline header is outside of the control portion of the HTTP request modifiable by a network address translation device.

13. A non-transitory computer readable medium including instructions that when executed on a computer are operable to:
    monitor, at an edge router device, domain name messages sent from an endpoint device;
    store addresses from the domain name messages in a table;
    receive a hypertext transfer protocol (HTTP) request including an internet protocol (IP) address;
    determine whether the IP address is present in or absent from the addresses in the table;
    insert first metadata in the HTTP request in response to the IP address being absent from the table and second metadata in the HTTP request in response to the IP address being present in the table; and forward the HTTP request to a security server at a remote network different than a network of the edge router device, according to the metadata in the HTTP request, wherein the security server examines the HTTP request based on the metadata inserted in the HTTP request to perform a first inspection in response to the first metadata when the IP address is absent from the table and perform a second inspection in response to the second metadata when the IP address is present in the table.

14. The non-transitory computer readable medium of claim 13, wherein the IP address is associated with a command server for a botnet.

15. The non-transitory computer readable medium of claim 13, wherein the security server blocks the HTTP request based on the metadata inserted in the HTTP request.

* * * * *